United States Patent
Cipriano et al.

(10) Patent No.: US 8,387,472 B2
(45) Date of Patent: Mar. 5, 2013

(54) METHOD AND HAND-OPERATED SENSOR WITH ADAPTIVE DETECTION THRESHOLD FOR THE DETECTION OF FOREIGN OBJECTS EMBEDDED IN BUILDING STRUCTURE SUBGRADES

(75) Inventors: Patrik Cipriano, Sevelen (CH); Torsten Gogolla, Schaan (LI); Andreas John, Berschis (CH); Christoph Wuersch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 425 days.

(21) Appl. No.: 12/622,855

(22) Filed: Nov. 20, 2009

(65) Prior Publication Data

US 2010/0186504 A1 Jul. 29, 2010

(30) Foreign Application Priority Data

Nov. 21, 2008 (DE) .......... 10 2008 058 457

(51) Int. Cl.
*G01D 21/00* (2006.01)
*G01V 3/00* (2006.01)
(52) U.S. Cl. .......... 73/866.5; 702/94; 702/150; 702/189
(58) Field of Classification Search .......... 73/493, 73/510–511, 866.5; 324/67; 702/193, 189, 702/92, 94, 95, 97, 150, 153, 141; 340/686.6, 340/686.1

See application file for complete search history.

(56) References Cited

U.S. PATENT DOCUMENTS

| | | | | |
|---|---|---|---|---|
| 2,874,349 A | * | 2/1959 | Staats | 324/202 |
| 3,820,010 A | * | 6/1974 | Sudmeier | 324/301 |
| 4,054,878 A | * | 10/1977 | Diehl | 342/142 |
| 4,357,833 A | * | 11/1982 | Wiklund et al. | 73/490 |
| 4,500,749 A | * | 2/1985 | Khoshnevis | 178/19.01 |
| 4,669,054 A | * | 5/1987 | Schlunt et al. | 708/816 |
| 5,600,942 A | | 2/1997 | Strosser | |
| 6,003,376 A | * | 12/1999 | Burns et al. | 73/584 |

(Continued)

FOREIGN PATENT DOCUMENTS

| | | |
|---|---|---|
| CH | 676051 A5 | 11/1990 |
| DE | 35 35 117 C1 | 12/1986 |

(Continued)

OTHER PUBLICATIONS

Taffe & Wiggenhauser, "Zerstörungsfreie Zustandsermittlung and Qualitätssicherung in der Betoninstandsetzung", Berlin, Germany, pp. 2-14, 2005.

(Continued)

*Primary Examiner* — Helen C. Kwok
(74) *Attorney, Agent, or Firm* — Crowell & Moring LLP (57) ABSTRACT

A method for the detection of objects embedded in building structure subgrades such as cable, concrete reinforcing bars, conduit pipe and the like as well as a hand-operated sensor with an adaptive detection threshold operating according to the method, is disclosed. To reduce an over-detection with the adaptation of the detection threshold, a change in the direction of movement of the sensor being guided over the surface area is recorded with respect to an embedded object. The determination of a change in the direction of movement preferably takes place by measuring the sensor acceleration in two directions with respect to the embedded object. Corresponding speeds are computed at least as estimates from the acceleration values in order to generate a conclusion about a reversal of the direction of movement.

15 Claims, 12 Drawing Sheets

U.S. PATENT DOCUMENTS

| | | | |
|---|---|---|---|
| 7,120,564 B2 * | 10/2006 | Pacey | 702/193 |
| 7,671,577 B2 * | 3/2010 | Skultety-Betz et al. | 324/67 |
| 7,701,191 B2 * | 4/2010 | Skultety-Betz et al. | 324/67 |
| 7,764,061 B2 * | 7/2010 | Skultety-Betz et al. | 324/67 |
| 8,111,169 B2 * | 2/2012 | Krapf et al. | 340/686.6 |
| 2004/0012600 A1 | 1/2004 | Deering et al. | |
| 2006/0238401 A1 * | 10/2006 | Wuersch et al. | 342/22 |

FOREIGN PATENT DOCUMENTS

| | | |
|---|---|---|
| DE | 197 31 560 A1 | 2/1999 |
| DE | 10 2004 006 015 A1 | 8/2005 |
| DE | 10 2005 007 803 A1 | 8/2006 |
| DE | 10 2005 015 325 A1 | 10/2006 |
| DE | 10 2005 015 326 A1 | 10/2006 |
| DE | 10 2006 025 881 A1 | 12/2007 |
| EP | 0 735 384 A2 | 10/1996 |
| WO | WO 2004/095076 A1 | 11/2004 |

OTHER PUBLICATIONS

Mietz & Fischer, "Verifizierung zerstörungsfreier Prüfverfahren zur Detektion von Spannstahlschäden an Spannbetonbauteilen mit nachträglichem Verbund", Berlin, Germany, pp. 656-663, 2005.

German Search Report, dated Nov. 18, 2009, 6 pages.

* cited by examiner

METHOD AND HAND-OPERATED SENSOR WITH ADAPTIVE DETECTION THRESHOLD FOR THE DETECTION OF FOREIGN OBJECTS EMBEDDED IN BUILDING STRUCTURE SUBGRADES

This application claims the priority of German Patent Document No. 10 2008 058 457.6, filed Nov. 21, 2008, the disclosure of which is expressly incorporated by reference herein.

BACKGROUND AND SUMMARY OF THE INVENTION

The invention relates to a method for detecting objects embedded in building structure subgrades such as cable, concrete reinforcing bars, conduit pipe and the like by sweeping or scanning a specified surface area of the building structure subgrade being analyzed by means of a hand-operated sensor with adaptive detection threshold. The invention also relates to a hand-operated sensor with an adaptive detection threshold for performing the method.

Inductive sensors, particularly eddy-current sensors, flow management detectors, magnetic sensors such as Hall, fluxgate and magnetoresistive sensors, but also capacitive detectors (e.g., stud sensors) or even sensors that measure an electrostatic field, such as hum detectors or live-wire detectors are possibilities for detectors in hand-operated or hand-held sensors for detecting objects embedded in normal building structure subgrades such as concrete, brick, wood, plaster, etc.

Objects in the sense meant here are principally elements embedded in walls and floors or similar subgrades, such as cable, concrete reinforcing bars, conduit pipe, undesired wood beams and the like, which must be detected and avoided as much as possible when processing the subgrade in question by means of digging equipment (drill, jackhammer, chisel and the like).

Because the signal strengths of typical hand-operated sensors, also designated as "field sensors," depend very heavily on the surface distance of the aforementioned type of objects embedded in the building structure subgrade, namely up to the inverse sixth distance power, these types of sensors require very high signal dynamics in order to be able to detect objects close to the surface, on the one hand, and objects located deeper below, on the other. Detection by means of such a hand-operated sensor normally takes place by using a sensor to scan or sweep the location where a respective objectionable object is suspected to be several times. When using a threshold detector, starting at a specific signal strength it indicates that an object is located beneath the sensor. Because of influences from the subgrade itself, e.g., in the case of ferritic subgrades likes those represented by certain types of brick or magnetic pebble inclusions in concrete as well as due to altered dielectric properties, the conductivity of the subgrade and the like, the signal of the sensor is weakened more or less in an uncontrollable manner. A constant scanning threshold, i.e., a detector with a constantly set threshold value, cannot be used. In addition, the use of the sensor requires that even smaller objects and those located deeper below can still be detected reliably along with larger objects or those located closer to the surface, which supply a signal that is stronger by orders of magnitude. For this reason, adaptive detection thresholds are typically used in sensors of the aforementioned type.

In order that these types of adaptive detection thresholds function reliably requires that the entire to-be-analyzed surface area of the building structure subgrade be scrutinized at least once, i.e., swept or scanned by the hand-operated sensor. The detection threshold cannot be reliably set until a maximum has been passed through. If an object is not completely scanned in the process, then misdetections arise, which are also called "over-detections." In this case, the sensor cannot differentiate whether the registered maximum was caused by scanning above and over the object or merely by approaching and changing direction with respect to the embedded object.

Figure 3A:
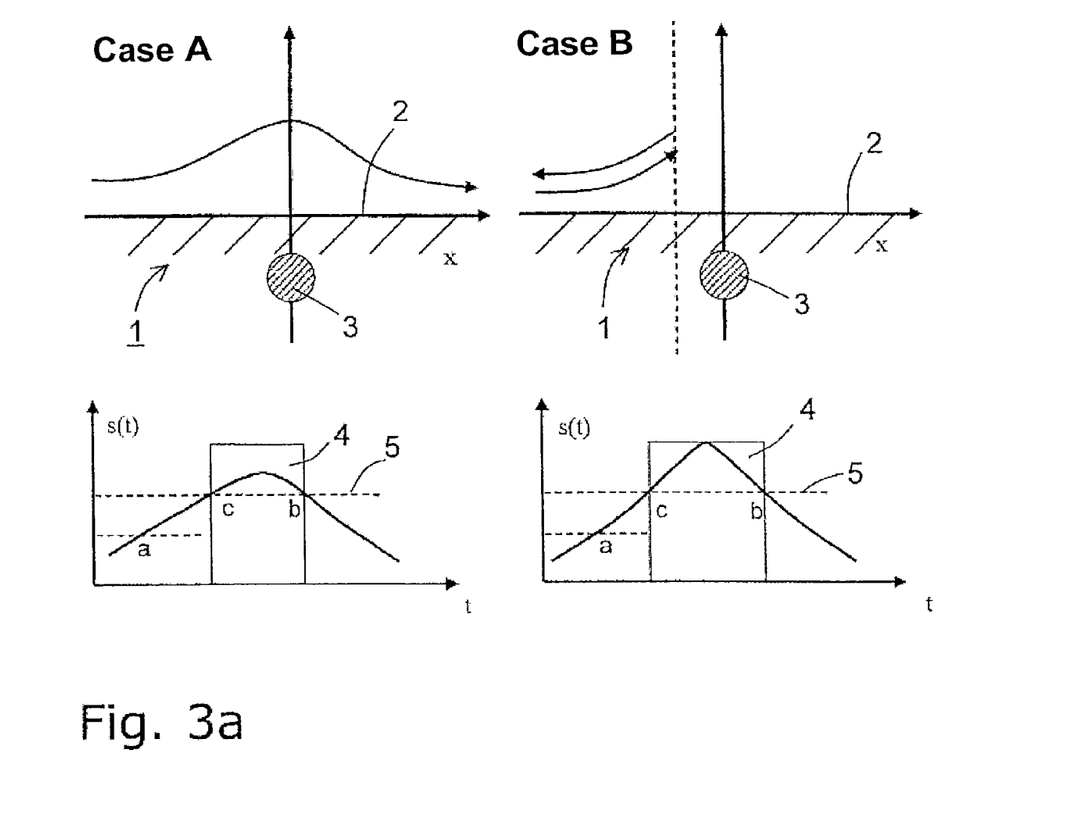
FIGS. 3a to 3c are schematic diagrams of the progression of signals that are generated with a hand-operated sensor for detecting objects in building structure subgrades, wherein several different case constellations are taken into account.
Figure 3B:
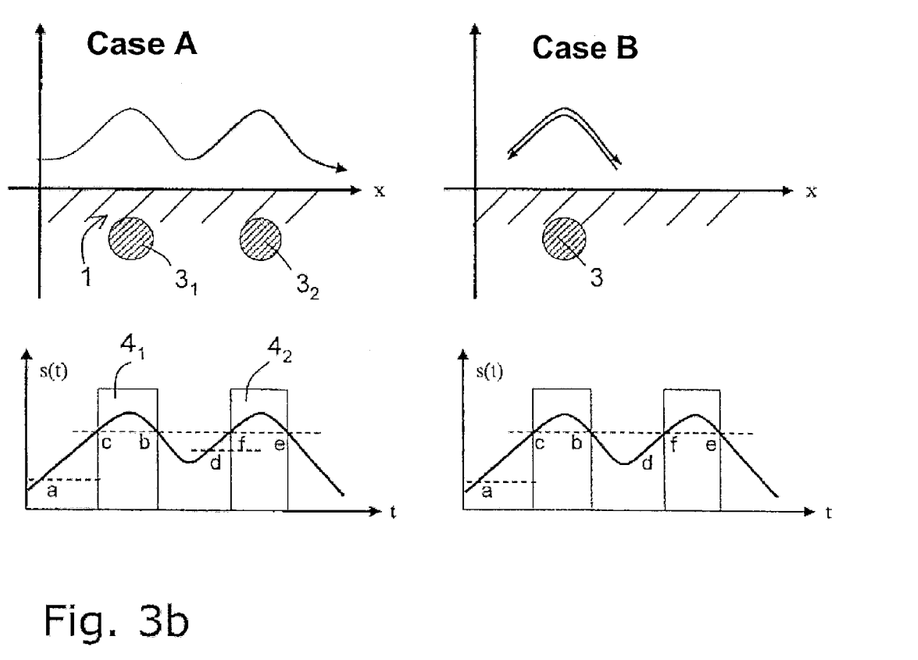
Figure 3C:
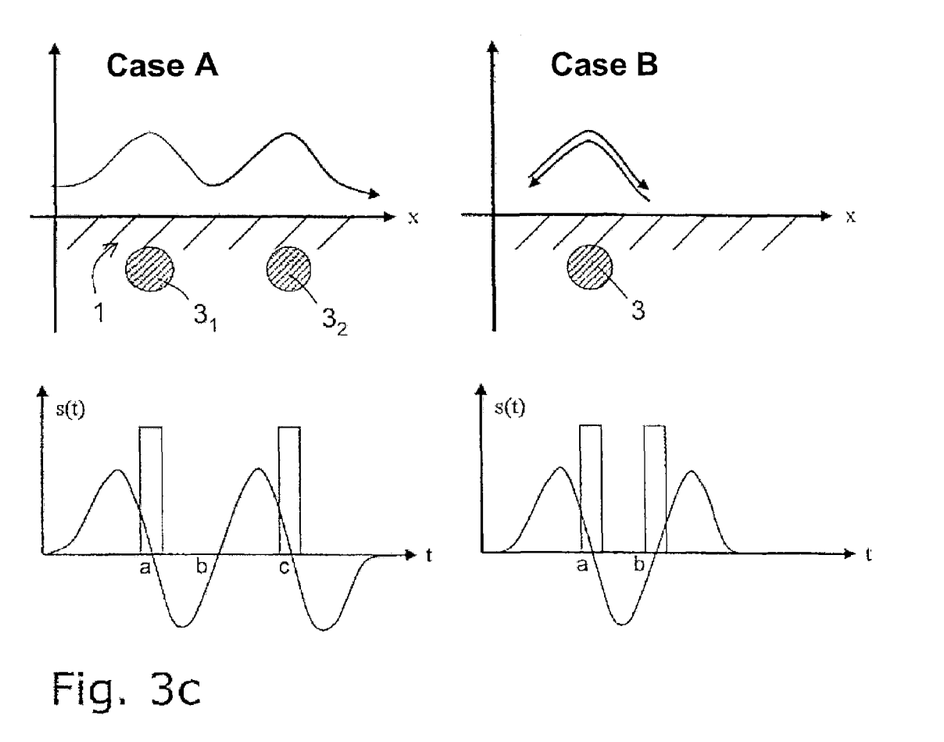

This problem is explained in greater detail on the basis of FIGS. 3a through 3c of the enclosed drawings:

A to-be-analyzed building structure subgrade 1 is scanned by means of a hand-operated sensor 10 (see FIG. 1, explained in greater detail in the following) in the region of a surface area 2 in a scanning direction x. Located beneath the surface at a specific distance is a to-be-detected object 3, for example a concrete reinforcing bar. A scan process with a sensor 10, which can also be designated as a sweep sensor, is explained based on Case A in FIG. 3a. The user starts the scan process to the left of the object 3. Since it is not known at the beginning how great the signal s(t) will be, the detection threshold for object detection is likewise unknown. A very low detection threshold is set initially, which is already exceeded at Point a (lower left diagram, FIG. 3a) so that in this case object indication is already activated. Once the object or the maximum of s(t) is scanned at Point b, the variable upper detection threshold can be set and object indication can be deactivated again. For precision localization, the user must now move the sensor 10 back so that the object detection will again be activated at the now known upper detection threshold at Point b and deactivated again at Point c.

The object indication range is now restricted as compared to the initial object scanning. Even if the user moves the sensor 10 back and forth several times, the upper detection threshold and thus the curtailed object indication range are maintained. In Case B, the sensor 10 initially approaches the object 3, but is moved backward before it reaches the object 3. In this case as well, an object is indicated between Points a and b during the first approach, and when moving back between Points b and c. However, in this case the object indication is inaccurate. In this context, this can be called an over-detection. The two Cases A and B cannot be differentiated in the time progression or signal progression s(t). In both cases, a specific detection threshold 5 is established and indicated as the case may be, whereby, however, Case B on the right represents a so-called "over-detection" within the meaning of the terminology used here.

FIG. 3b depicts another critical case. Here, the sensor 10 scans two embedded objects $3_1$, $3_2$ in Case A. According to FIG. 3a, when exceeding a first threshold at Point a, the object detection is activated, and deactivated again at Point b. The upper detection threshold is therefore known at Point b. However, it must be deleted again at Point d after scanning the local minimum, because it is not known how large the subsequent maximum will be. A new minimum threshold is set again at Point d, which is exceeded there so that the object indication is activated at d. The new upper detection threshold is not known until Point e. Here the object indication is deactivated again. By moving the sensor 10 back, the object indication range is restricted to Points e and f according to FIG. 3a. In Case B in FIG. 3b, the sensor is moved back and forth over the object 3 as in the case in FIG. 3a. The same signal signature s(t) as in Case A in FIG. 3a emerges. At Point d, however, in contrast to Case A, the upper detection threshold determined at Point b may not be deleted so that the restricted object indication range is retained.

FIG. 3c shows the behavior according to FIG. 3b for a differential sensor. The sensor 10 scans two embedded objects $3_1$, $3_2$ in Case A. In the case of the differential sensor, the object positions correspond to the zero passages of the negative slope of the signal s(t). Located precisely between the two objects $3_1$, $3_2$ for reasons of symmetry is another zero passage b with a positive slope, which is not connected to an object 3 however. This produces an inaccurate object indication or over-detection between the two objects. In Case B, the sensor is again moved back and forth over an object.

In this case, the zero passage b with a positive slope corresponds very well to the object position.

With all three cases explained on the basis of FIGS. 3a through 3c, a clear allocation of a buried object is not reliably possible with the previously known sweep sensor, or with the differential sensor, because a differentiation cannot be made between the respective Cases A and B.

The objective of the invention is avoiding an over-detection or at least reducing an over-detection rate of the sensors of the aforementioned type in order to thereby increase the reliability of object detection. In addition, efforts are also made to improve the precision and reliability in determining an object over-detection, in particular concrete reinforcing bar over-detection and the diameter of the concrete reinforcing bars concealed in the building structure subgrade.

The invention relates to a method for the detection of objects embedded in building structure subgrades such as cable, concrete reinforcing bars, conduit pipes and the like by sweeping a hand-operated sensor with an adaptive detection threshold over a specified surface area of the building structure subgrade being analyzed, wherein to reduce an over-detection with the adaptation of the detection threshold, a change in the direction of movement of the sensor being guided over the surface area is recorded with respect to an embedded object. In particular, the acceleration of the hand-operated sensor is recorded in at least two directions with respect to an embedded object in order to compute the corresponding speeds at least as estimates from the acceleration values so that a conclusion about a reversal of the direction of movement of the hand-operated sensor can be determined with respect to an embedded object. A signal is advantageously generated as a function of the sensor path from the estimated value(s) of the speed, correlated with the temporal progression of the signal supplied by the object and a conclusion about the dimensions of the embedded object is obtained therefrom.

A hand-operated sensor with adaptive detection threshold for the detection of objects embedded in building structure subgrades such as cable, concrete reinforcing bars, conduit pipes and the like by sweeping a surface area of a building structure subgrade being analyzed is characterized according to the invention in that the sensor for reducing an over-detection with the adaptation of the detection threshold is equipped with a motion sensor device for determining a change in the direction of movement of the sensor guided over the surface area with respect to an embedded object. It is preferred that the motion sensor device is equipped with an at least biaxial acceleration sensor and a device fed by the signals of the acceleration sensor for measuring the momentary sweeping speed of the sensor and for recording the directional change points of the sensor sweeping over the surface area with respect to an embedded object. As a rule and preferably, the device for measuring the momentary sweeping speed is equipped with at least one integrator for each acceleration sensor for determining the momentary sweeping speed of the sensor and for detecting a directional change with respect to an object embedded in the building structure subgrade.

Moreover, it is advantageous to equip the sensor with a device for recording the path covered by the sensor when scanning the surface area by sweeping, wherein the device for recording the path has an optical, two-dimensional correlator for determining the relative movement of the to-be-analyzed surface area of the building structure subgrade. In this case, an optical visualization device can also be provided, on which a representation of the trajectory of the sensor sweeping over the surface area is displayed based on the signals supplied by the correlator. The correlator can have at least two laser distance sensors at a predetermined angle from each other, or, alternatively, a laser-stream sensor device integrated into the sensor and functioning in the manner of a computer mouse.

In the case of an advantageous embodiment of the invention optimized for determining the detection threshold of the sensor, a triplet of acceleration sensors is provided, on the one hand, with a pair of acceleration sensors that are at right angles to one another as well as a third acceleration sensor arranged at a fixed distance from the acceleration sensor pair, whose measuring axis is aligned with one of the measuring axes of the acceleration sensor pair that are at right angles to one another. In order to also be able to record the rotational angle of the sensor around a fixed point, a gyroscope can also be integrated into the sensor, wherein the acceleration sensors can be micromechanical acceleration indicators, on the one hand, and the gyroscope can advantageously be a micromechanical vibration rotational rate sensor according to the Coriolis principle.

The invention and advantageous details are explained in greater detail in the following in examples of exemplary embodiments making reference to the drawings.

DETAILED DESCRIPTION OF THE DRAWINGS

Figure 1:
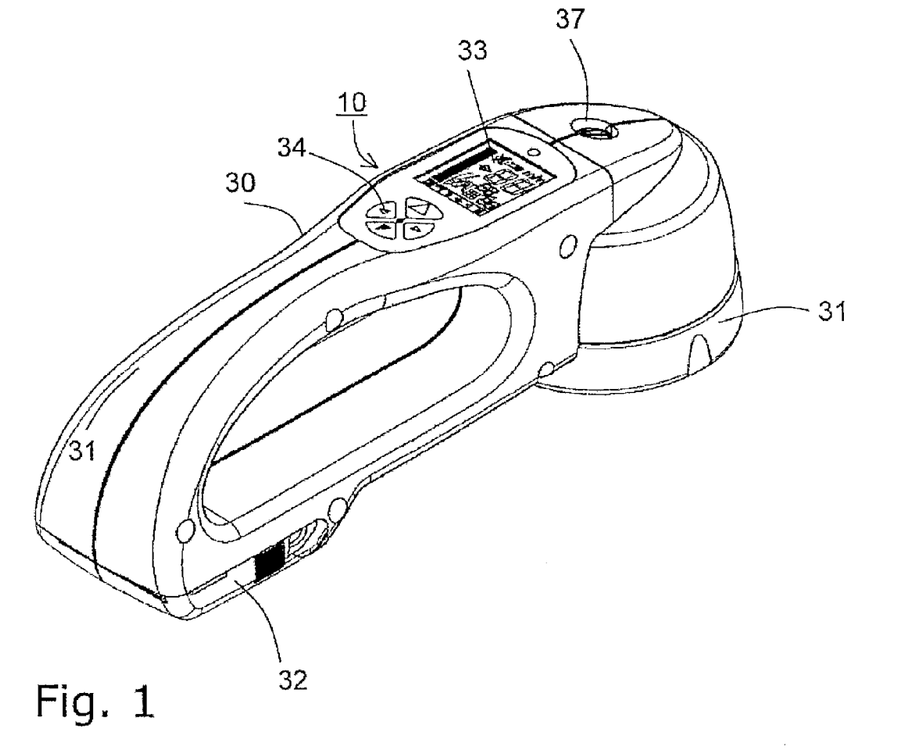
FIG. 1 is a perspective representation of a hand-operated sensor according to the invention for detecting objects embedded in a building structure subgrade.
Figure 2:
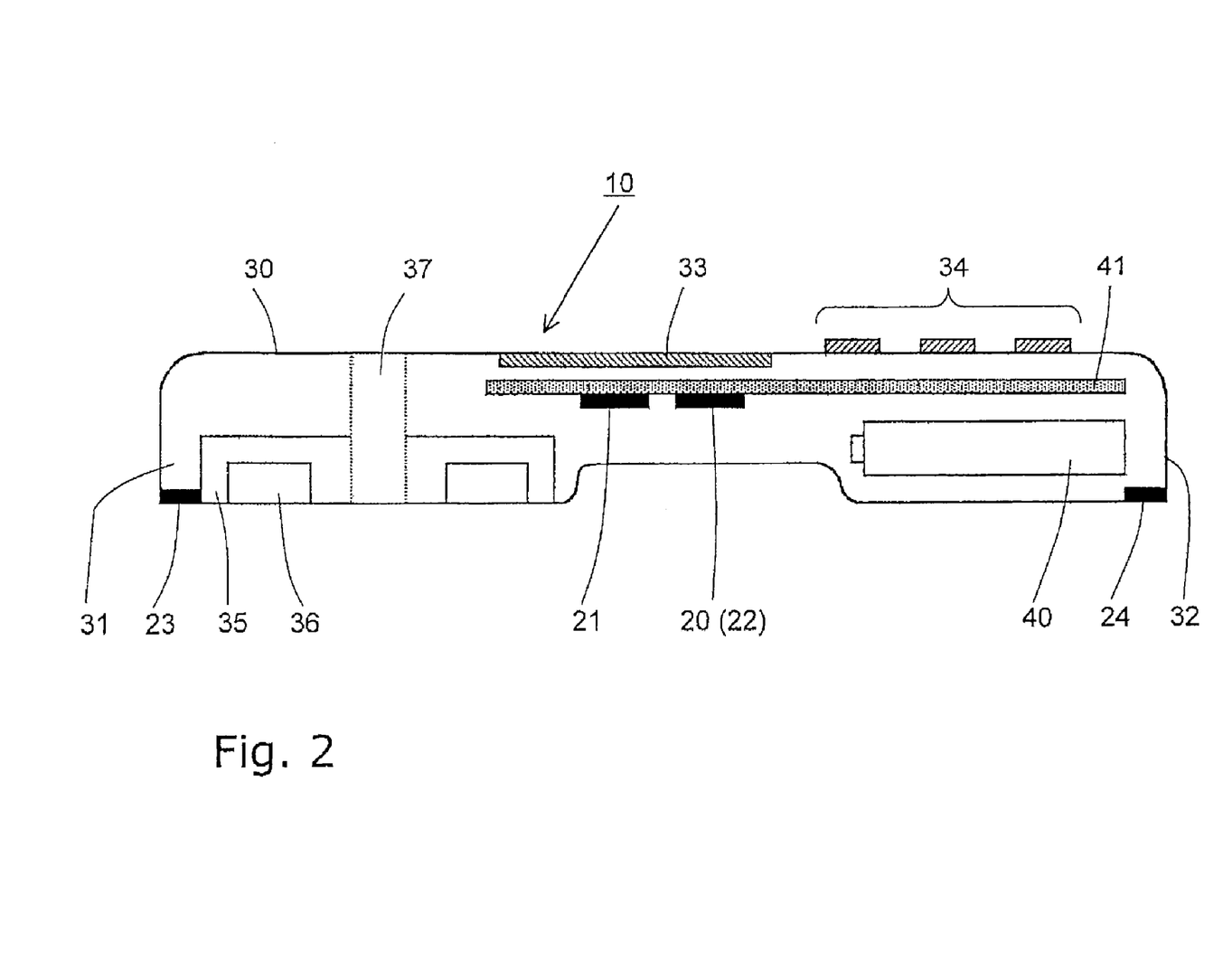
FIG. 2 is a schematic sectional representation of the hand-operated sensor according to FIG. 1.

The isometric representation of a hand-operated sensor 10 for detecting foreign objects, which can be embedded in building structure subgrades, according to FIG. 1 has a handy housing 30 with a hand grip, which has a certain similarity with a classic telephone receiver. Built into the front sensor area 31 on the bottom side are, for example, an excitation coil or transmitting coil 35 (see FIG. 2) as well as a sensor coil or receiver coil 36 arranged coaxially thereto in the interior. A passage opening 37 is used for optically marking the surface of a to-be-analyzed building structure subgrade, for example with the positions of concrete reinforcing bars embedded in the building construction subgrade. A free space to accommodate a battery 40 is provided on the lower end 32 on the base side. An optical correlator 23 or 24 can be inserted on both the top and bottom ends of the hand-operated sensor, whose function is explained further below. In the interior, indicated purely schematically, is a printed circuit board 41 with all of the processing electronics. In addition, fixed at a suitable position on this printed circuit board 41 is at least one acceleration sensor 20, 22 as well as, additionally or alternatively, a micromechanical rotational rate sensor (gyroscope) preferably in a strap-down configuration. A display device 33 and a control pad 34 are incorporated in the top surface of the housing 30.

In order to prevent the over-detection explained in the foregoing, the inventive idea consists of determining the movement of the hand-operated sensor on a to-be-analyzed surface area of a building structure subgrade, for example on a wall by means of an additional motion sensor. In the process, particularly the reversal of the direction of movement of the sensor is supposed to be detected in order to decide whether, making reference to FIGS. 3a through 3c, Case A (direct scanning of the object) or Case B (approach and subsequent backing off from the object) exists.

Because of the motion reversal detector or motion detector built into the sensor 10, it is now possible to differentiate between the respective Cases A and B in the cases shown in FIGS. 3a through 3c. In particular, with the aid of the motion reversal detector in the respective Case B, it can be recognized that the motion reversal here does not take place after exceeding a maximum so that the object indication is deactivated.

A comparatively simple, reliable, but also cost-effective solution to the problem on which the invention is based can be attained by means of multiaxial acceleration pick-ups, in particular with an acceleration sensor pair with a downstream speed estimator. This is illustrated on the basis of FIG. 4.

Figure 4:
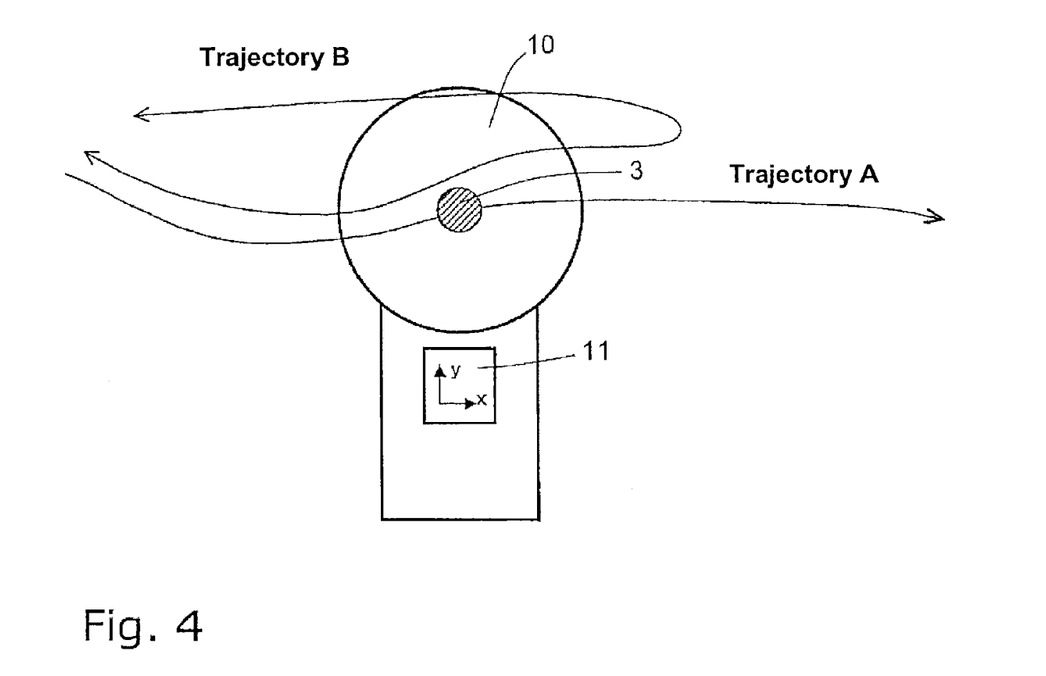
FIG. 4 is a schematic diagram of a sensor that is guided on different paths (trajectories) over a to-be-analyzed building structure subgrade, in which a to-be-detected object such as a concrete reinforcing bar is located.
Figure 5:
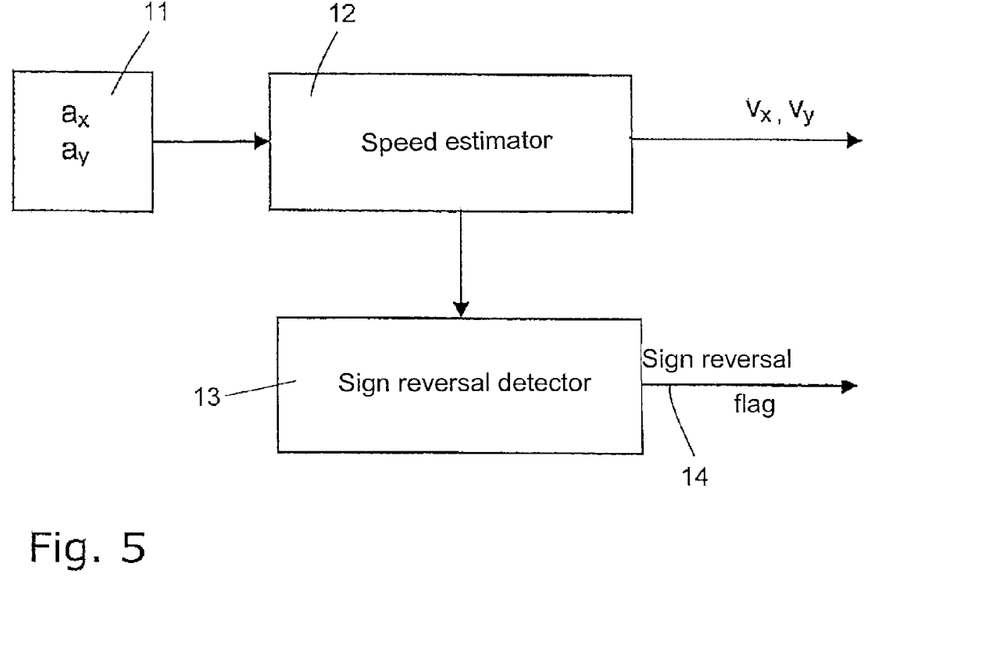
FIG. 5 is a functional block diagram related to signal processing during the determination of a directional reversal of the sensor sweeping over the building structure surface with respect to an object embedded in the subgrade.

The sensor 10, which is only depicted with its schematic outline, is equipped with an acceleration sensor pair 11 that preferably and as a rule detects accelerations in a longitudinal or transverse direction of the sensor 10. This type of pair of acceleration indicators can also be designated as a 2D acceleration sensor. The acceleration sensor pair 11 supplies acceleration values $a_x$ and $a_y$, which, as FIG. 5 illustrates, are conveyed to a speed estimator 12, which supplies at least approximated speed values $v_x$, $v_y$ from the acceleration values via a corresponding integrator. The speed values $v_x$, $v_y$ are fed to a sign reversal detector 13, which detects a sign reversal and thus a directional reversal of the motion of the sensor 10 with respect to a to-be-detected object embedded in the building construction subgrade and supplies a sign reversal flag 14 for the further process.

In the simplest case, the speed estimator 12 can be made of a bandpass-limited integrator. Additional marginal conditions can be taken into account in this case, for example such that the sensor 10 may be moved on a surface area with a radius of 1 m for example, or that to obtain a reliable measurement a sphere with a radius of approx. 1 m may not be left. Because of these types of marginal conditions it is possible to prevent the integrators from drifting away.

The estimated speed value supplied by the speed estimator 12 can be used advantageously in the case of magnetic or inductive sensors to improve the quality of an estimate of the coverage and diameter of the to-be-detected objects. In this case, it must be taken into account that there are basically two signal shapes that can be used to determine, at least as estimates, the distance of an object from the surface of the building subgrade, i.e., the depth and the diameter of the object.

Figure 6:
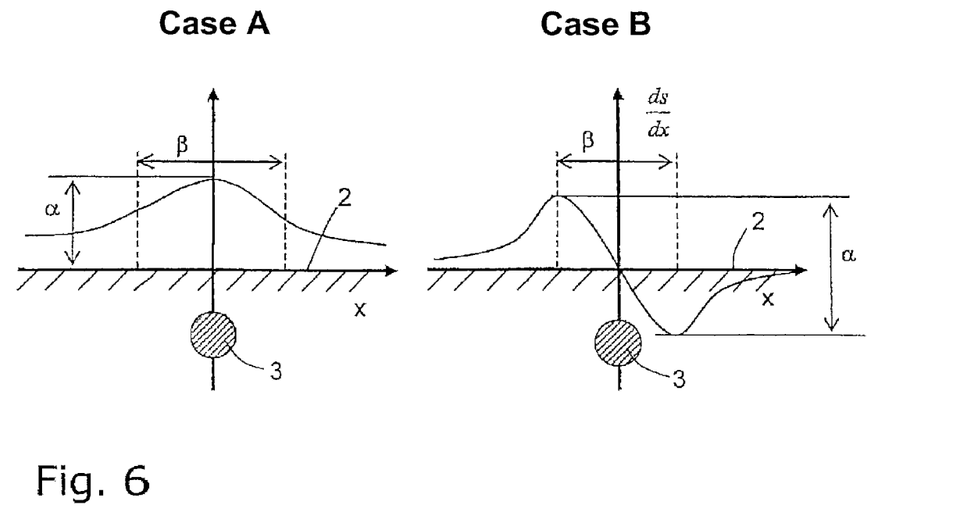
FIG. 6 illustrates signal progressions of an absolute sensor (Case A) and a differential sensor (Case B) from which a conclusion can be obtained about the dimensions, in particular the diameter dimensions of an object in the subgrade, during the application of the invention and direct determination of the scanning path.

If the measuring head of the sensor contains only a detection coil then it will establish a maximum directly over a metallic object, for example a concrete reinforcing bar. This type of sensor can be designated as an absolute sensor. Case A in FIG. 6 illustrates the progression of the signal strength as a function of the path centered around the location of the object 3. The signal progression shows a bell shaped profile.

If, on the other hand, one uses a differential arrangement, then one typically measures an S curve (Case B in FIG. 6), which has a zero passage at the location of the object 3. This curve represents the position-dependent derivation, i.e., the difference over a defined sensor distance d of the bell-shaped curve in Case A. Hence the name "differential" sensor arrangement.

With a knowledge of the covered path x, the depth and the approximate diameter of the object 3 can be determined from the two curves. This will be explained in greater detail making reference to the two signal diagrams in FIG. 6.

Initially there is no direct information about the covered path. As a result, in the case of a hand-operated sensor, normally no information about the amplitude α with respect to a fixed path section β can also be obtained and used. However, if an estimated value for the speed is generated according to the invention, it can be used to generate a signal as a function of the path from the time signal or the temporal derivation of the signal progression s(t) (FIGS. 3a through 3c). Therefore the goal is obtaining an estimated value for the local derivation of this signal progression, i.e., s(t) and v(t) are given and s(x) is sought.

Whereby:
s: Signal
x: Path
t: Time
v: Speed x(t) may be computed explicitly through a band-limited integrator. Then s(x) can be scanned directly (interpolation). Another possibility is not directly computing s(x), but the local derivation of s(x) according to x. This derivation is still only dependent on the location, but not on the time or therefore on the scanning speed.

$$\frac{ds}{dt} = \frac{ds[x(t)]}{dt} = \left(\frac{ds}{dx}\right)\left(\frac{dx}{dt}\right) = \left(\frac{ds}{dx}\right) \cdot v$$

After solving according to ds/dx:

$$\frac{ds}{dx} = \left(\frac{ds}{dt}\right)\left(\frac{dt}{dx}\right) = \left(\frac{ds}{dt}\right) \cdot \frac{1}{v}$$

The path segment, i.e., the width β, can be determined from this signal independent of the scanning speed of the sensor. The diameter of the object 3 can then be determined at least approximately from the path value of the width β. Reference is made in this respect to the technical paper by I. Alldred et al. "Determination of Reinforcing Bar Diameter and Cover by Analyzing Traverse Profiles from a Cover Meter" in Conference Papers of International Symposium on Non-Destructive Testing in Civil Engineering (NDT-CE), Sep. 26-28, 1995, Pages 721-728 as well as to German Patent Document No. DE 35 35 117 C1.

A modified and improved embodiment of the invention consists of using an optical two-dimensional correlator (2D correlator), which can be used to determine the relative motion of the sensor on the surface area of the subgrade. This type of correlator measurement is basically known, for example in an application with a hand-operated printing device, such as described in US 2004/0012600 A1. As a result, the trajectory of the sensor can be recorded directly. Laser or LED mouse sensors are considered as suitable sensors.

The path information supplied by the 2D correlator can be used directly for an individual scanning motion of the sensor over an object and/or to detect the direction reversal during the scanning motion. The direction reversal can then be detected simply by a sign reversal of the path difference x(tn)−x(tn−1) or by detection of a maximum from the path information x(t) itself. Appropriate thresholds and filters must be provided to realize robust reversal detection. This also allows over-detection to be avoided namely by detection of the directional reversal, and detection precision (coverage, determination of the object diameter) is improved. If, for example, the path information is known, then a single coil suffices to determine the diameter and the depth of a concrete reinforcing bar at the same time. In the case of a differential coil, one uses the maximum and minimum of the S curve (Ferroscan Technology). These are stored as a look-up table for a diameter and all depths. In the case of an individual non-differential coil, the maximum and the half width are used. The inventively determined path information is thus an important variable, which can very substantially increase the reliability of the detectors.

Figure 7:
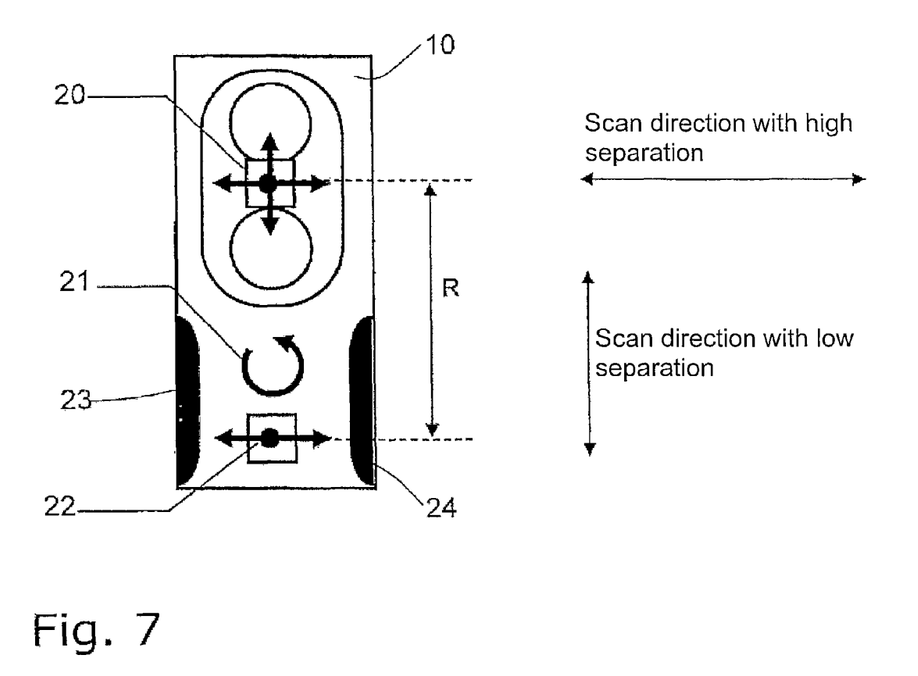
FIG. 7 is a schematic diagram of an advantageous exemplary embodiment of a sensor with the inventive characteristics in which three acceleration sensors and one gyroscope are installed.

A special advantageous embodiment of the invention is illustrated in FIG. 7 in particular for optimizing the detection threshold in the case of detectors which have a dual symmetry. The detection properties of these types of sensors differ depending upon whether the sensor is being moved from the left to the right or from the top to the bottom. This is advantageous above all in the case of magnetic detectors, because a good separation in scanning direction x and a great detection depth can be thereby achieved. It must be taken into consideration in this case that an inductive (magnetic) sensor can achieve either a separation or a great detection depth. Both at the same time is not possible. A tradeoff between detection depth and separation must be selected in this case. The coil diameter at the same time determines the separation (large diameter→small separation) as well as the detection depth (large diameter→great detection depth). A good compromise is using oval or oblong coils. However, then scanning must always take place in the same direction (e.g., left to right).

However, if the sensor is skewed at the detection location, then the signal strength and the detection threshold, which were used to decide whether an object is located under the sensor arrangement, change, and are no longer correct. The detection switches for example to "no object." In order to avoid this, it would be advantageous to know the momentary angle of rotation around a fixed point, for example the center point of a coil arrangement present in the sensor.

In the embodiment in FIG. 7, first there is a 2D acceleration sensor 20, which detects sensor accelerations in the longitudinal and transverse direction of the sensor 10. In addition, a third acceleration sensor 22 is built in at a distance R, in particular in a scanning direction with low separation, whose measuring axis is aligned with a scanning direction with high separation. This allows the rotational angle of the sensor 10 to be computed at least approximately so that the corresponding detection thresholds that are stored in table form as a function of the rotational angle can be used.

In addition, the sensor 10 can be provided with a gyroscope 21, for example a rotational rate sensor according to the Coriolis principle in a micromechanical design, which can detect the momentary rotational angle of the sensor in particular around the center point of a coil arrangement.

Figure 8:
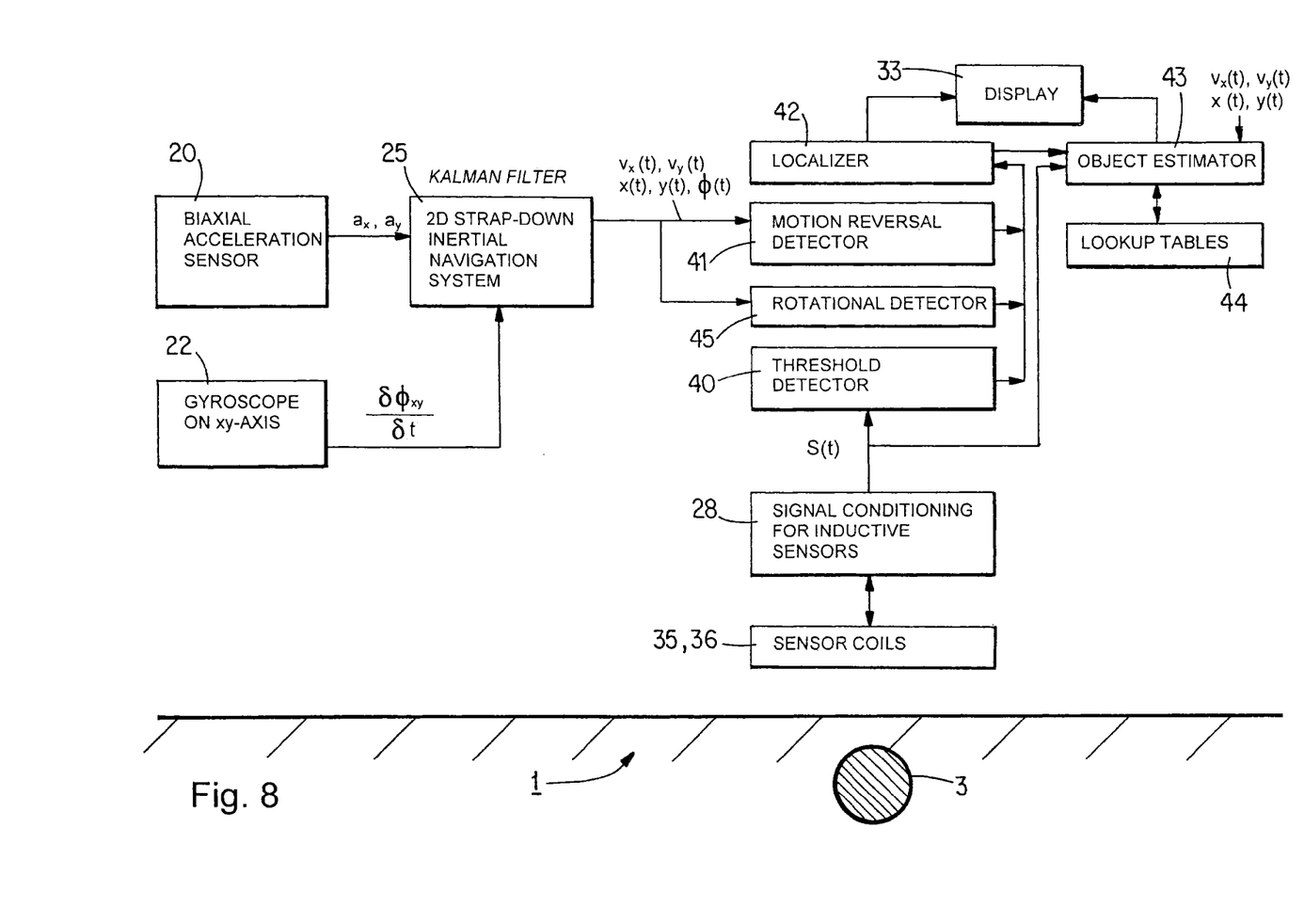
FIG. 8 is a basic circuit design in a block diagram representation of an inventive sensor with two acceleration sensors and one gyroscope (rotational rate indicator)

FIG. 8 illustrates the principle signal processing schema in block diagram representation for the case of the sensor arrangement according to FIG. 7, i.e., when the sensor 10 is equipped with a biaxial acceleration sensor 20 and a rotational rate sensor or gyroscope 21, which detects the rotational rates or the angular speeds. The acceleration values $a_x$, $a_y$ of the two acceleration sensors 20 as well as the rotational rates $\delta\phi_{xy}$ through $\delta t$ are converted in an inertial strap-down navigation system to time-dependent path or position values x(t) and y(t), time-dependent speed values $v_x(t)$ and $v_y(t)$ and a time-dependent angular value ϕ(t). A signal conditioning unit 28 prepares the temporal signal progression s(t) from the sensor signal of the scanning coil arrangement 35, 36. This signal s(t) is made available to a threshold detector 40, which determines the variable detection threshold. A motion reversal detector 41 detects a motion reversal by evaluating the path or speed values made available to it. A localizer 42 guarantees, with the detection threshold and the motion reversal information, reliable and closely tolerated object localization in the case of a scan over an object 3. According to the procedure in FIG. 3a through FIG. 3c an over-detection is thereby avoided. The object location range is represented, e.g., with a red LED or with a symbol on the display 33. A rotational detector 45 detects a skewing of the sensor 10 with the aid of the angular value ϕ(t). A skewing over an object 3 may cause a signal modulation with a non-symmetrical sensor arrangement, which corresponds to the signal signature of a translatory movement away from the object 3 so that, even though the sensor 10 continues to be located over an object 3, the object indication is lifted, because a signal decrease is generated by the rotation. This so-called under-detection is avoided because the rotational status is communicated to the localizer 42. In addition the signal s(t) along with the path and speed values are made available to an object estimator 43, which determines the object depth and object diameter with the aid of a look-up table 44 and then, if the localizer 42 indicates an object 3, depicts it on the display 33.

Figure 9:
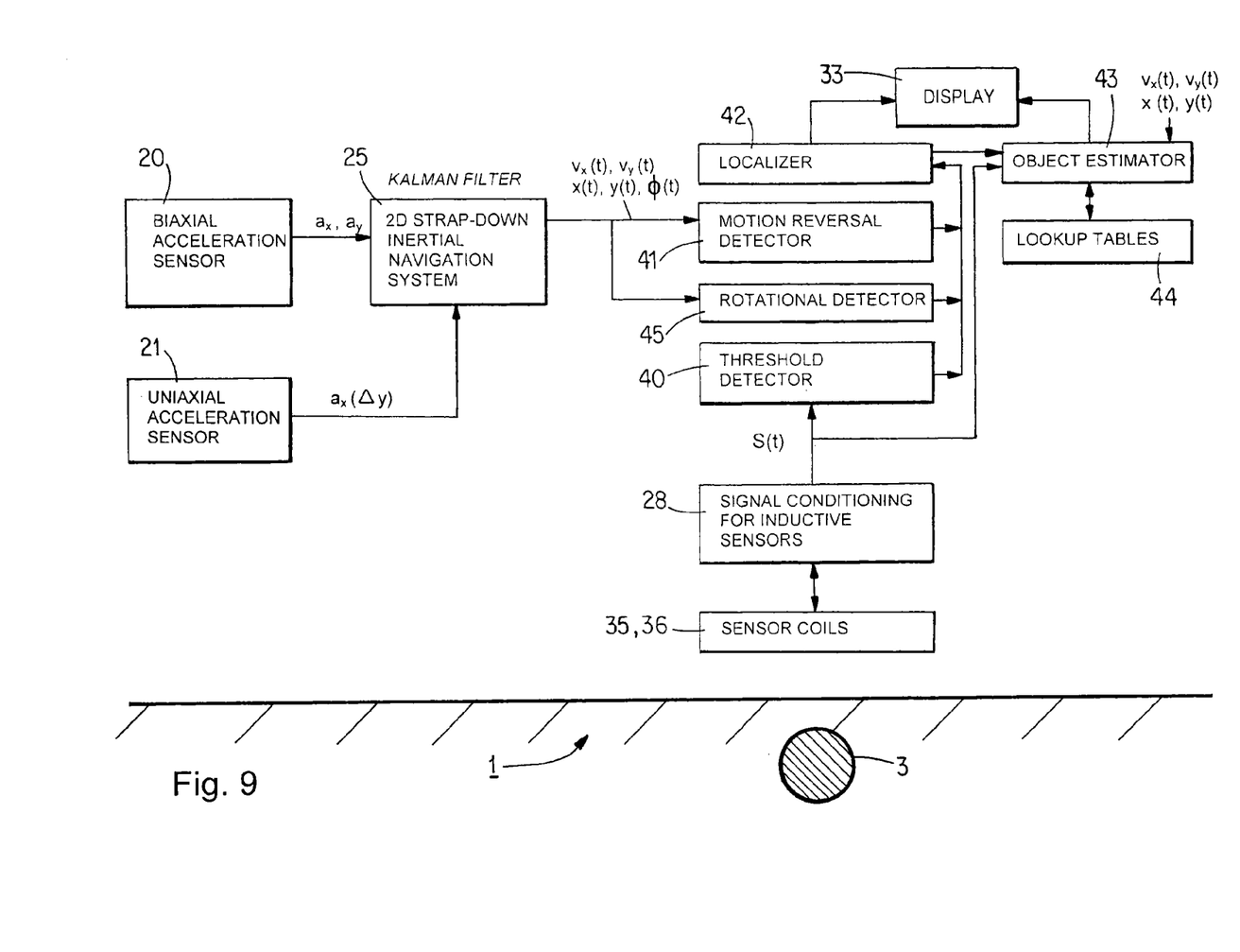
FIG. 9 is a block diagram arrangement of an inventive sensor with three acceleration sensors in the arrangement according to FIG. 7.

The signal processing arrangement in accordance with FIG. 9 corresponds essentially to that of FIG. 8 which has already been explained, however, with the difference that instead of the gyroscope 22, another uniaxial acceleration indicator 21 (see FIG. 7) is provided, or also as a supplement to the gyroscope 22 as the case may be. The other signal conditioning and processing up to visualizing the measuring result on the display 33 corresponds to that of FIG. 8.

Figure 10:
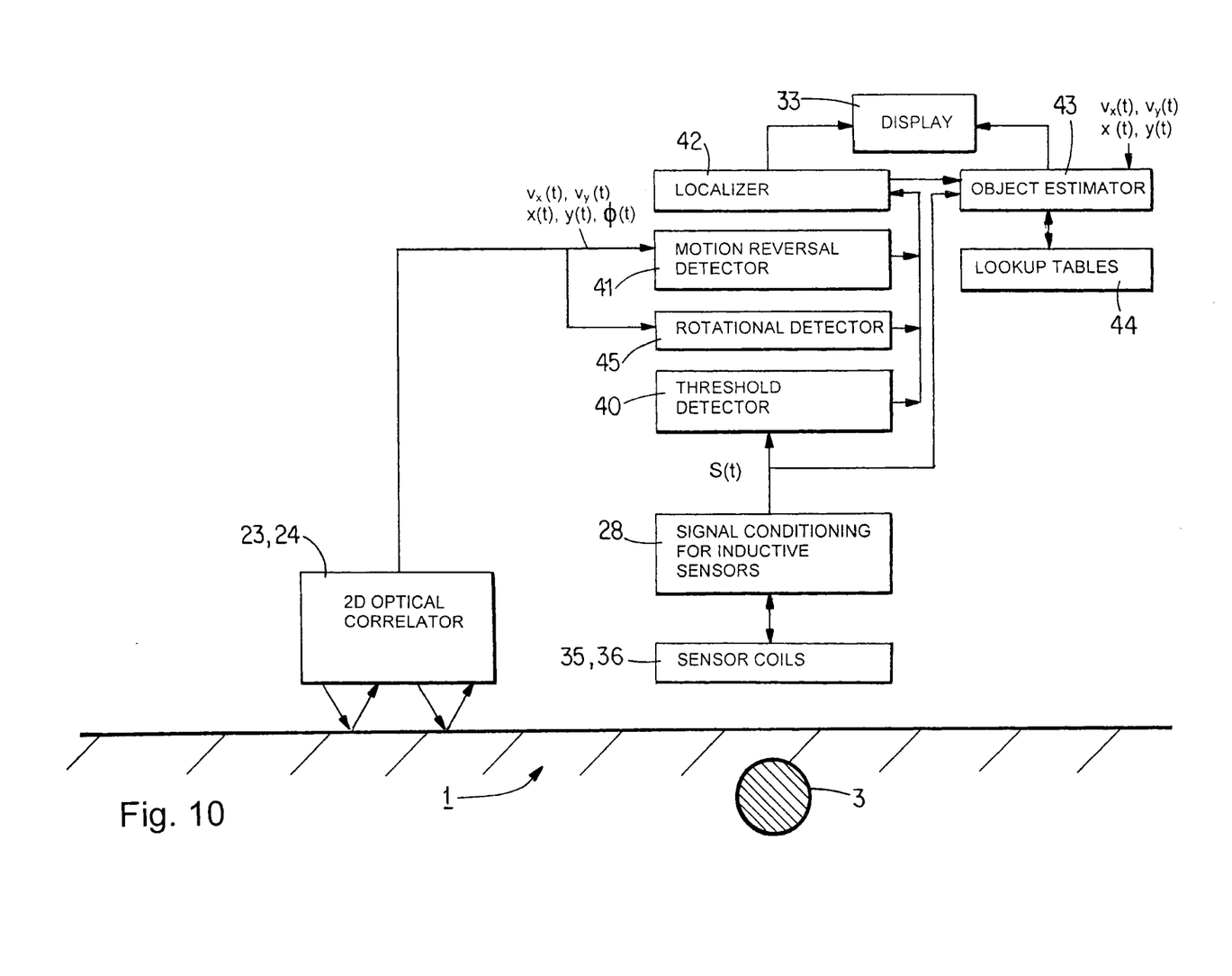
FIG. 10 is a block diagram representation of an inventive sensor with two optical correlators.

FIG. 10 illustrates a further or supplementary variation of an inductive sensor according to the invention with a determination of the depth and diameter of an object 3 embedded in a building structure subgrade 1. In this case, two optical correlators 23, 24 (also see FIG. 2) are provided. The remaining signal processing up to visual representation of the measuring result on the display 33 is similar to that of the embodiments according to FIGS. 8 and 9.

With the application of the invention, the above-mentioned over-detection rate can be reduced in sensors, in particular inductive sensors with adaptive detection threshold for detecting foreign objects embedded in building structure subgrades, and at the same time the reliability of detection can be increased. In addition, the precision and reliability of the determination of foreign objects, in particular concrete reinforcing bars and the diameter of their reinforcement, can be improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detection of objects embedded in building structure subgrades, comprising the steps of:
    sweeping a hand-operated sensor with an adaptive detection threshold over a surface area of a building structure subgrade being analyzed; and
    recording a change in a direction of movement of the hand-operated sensor being swept over the surface area with respect to an embedded object;
    wherein an acceleration of the hand-operated sensor is recorded in at least two directions with respect to the embedded object, wherein corresponding speed values are computed at least as estimates from acceleration values and a conclusion about a reversal of the direction of movement of the hand-operated sensor with respect to the embedded object is generated from the speed values.

2. The method according to claim 1, wherein a signal is generated as a function of a path of the hand-operated sensor from the estimated speed values and a conclusion is obtained therefrom about a dimension and a depth of the embedded object.

3. A hand-operated sensor with an adaptive detection threshold for detection of objects embedded in building structure subgrades, comprising:
    a motion sensor device, wherein the motion sensor device determines a change in a direction of movement of the hand-operated sensor when guided over a surface area with respect to an embedded object;
    wherein the motion sensor device includes at least one biaxial acceleration sensor and a device fed by signals of the at least one biaxial acceleration sensor for measuring a momentary sweeping speed and for recording directional change points of the hand-operated sensor sweeping over the surface area with respect to the embedded object.

4. The hand-operated sensor according to claim 3, wherein the device for measuring the momentary sweeping speed has at least one integrator for each acceleration sensor for measuring the momentary sweeping speed of the hand-operated sensor and for detecting a directional change with respect to the embedded object.

5. The hand-operated sensor according to claim 4, further comprising a device for recording a path covered by the hand-operated sensor when scanning the surface area by sweeping.

6. The hand-operated sensor according to claim 3, wherein there are a triplet of acceleration sensors and wherein a pair of the acceleration sensors are at right angles to one another and a third acceleration sensor is arranged at a fixed distance from the acceleration sensor pair, whose measuring axis is aligned with a one of a respective measuring axis of the acceleration sensor pair.

7. The hand-operated sensor according to claim 3, further comprising a gyroscope, wherein the gyroscope records a rotational angle of the hand-operated sensor around a fixed point.

8. The hand-operated sensor according to claim 7, wherein the at least one biaxial acceleration sensor is a micromechanical acceleration indicator and the gyroscope is a micromechanical vibration rotational rate sensor according to a Coriolis principle.

9. The hand-operated sensor according to claim 5, wherein the device for recording the path has an optical, two-dimensional correlator.

10. The hand-operated sensor according to claim 9, further comprising an optical visualization device on which a representation of a trajectory of the hand-operated sensor sweeping over the surface area is displayed based on signals supplied by the correlator.

11. The hand-operated sensor according to claim 10, further comprising a distance gauge with two laser correlators at a predetermined distance from each other.

12. The hand-operated sensor according to claim 9, wherein the correlator has at least two laser distance sensors at a predetermined angle from each other.

13. The hand-operated sensor according to claim 10, wherein the correlator is a laser-stream sensor integrated into the hand-operated sensor and functioning in a manner of a computer mouse.

14. A method for detection of objects embedded in building structure subgrades, comprising the steps of:
    sweeping a hand-operated sensor with an adaptive detection threshold over a surface area of a building structure subgrade being analyzed;
    recording a change in a direction of movement of the hand-operated sensor being swept over the surface area with respect to an embedded object;
    recording an acceleration of the hand-operated sensor in at least two directions with respect to the embedded object;
    computing corresponding speed values at least as estimates from acceleration values; and
    generating a conclusion about a reversal of the direction of movement of the hand-operated sensor with respect to the embedded object from the speed values.

15. A hand-operated sensor with an adaptive detection threshold for detection of objects embedded in building structure subgrades, comprising:
    a motion sensor device, wherein a change in a direction of movement of the hand-operated sensor is determinable by the motion sensor device when the hand-operated sensor is guided over a surface area with respect to an embedded object;
    wherein the motion sensor device includes at least one biaxial acceleration sensor and a device fed by signals of the at least one biaxial acceleration sensor;
    and wherein a momentary sweeping speed of the hand-operated sensor is measurable by the device and wherein directional change points of the hand-operated sensor are recordable by the device.

* * * * *